Patented Aug. 10, 1943

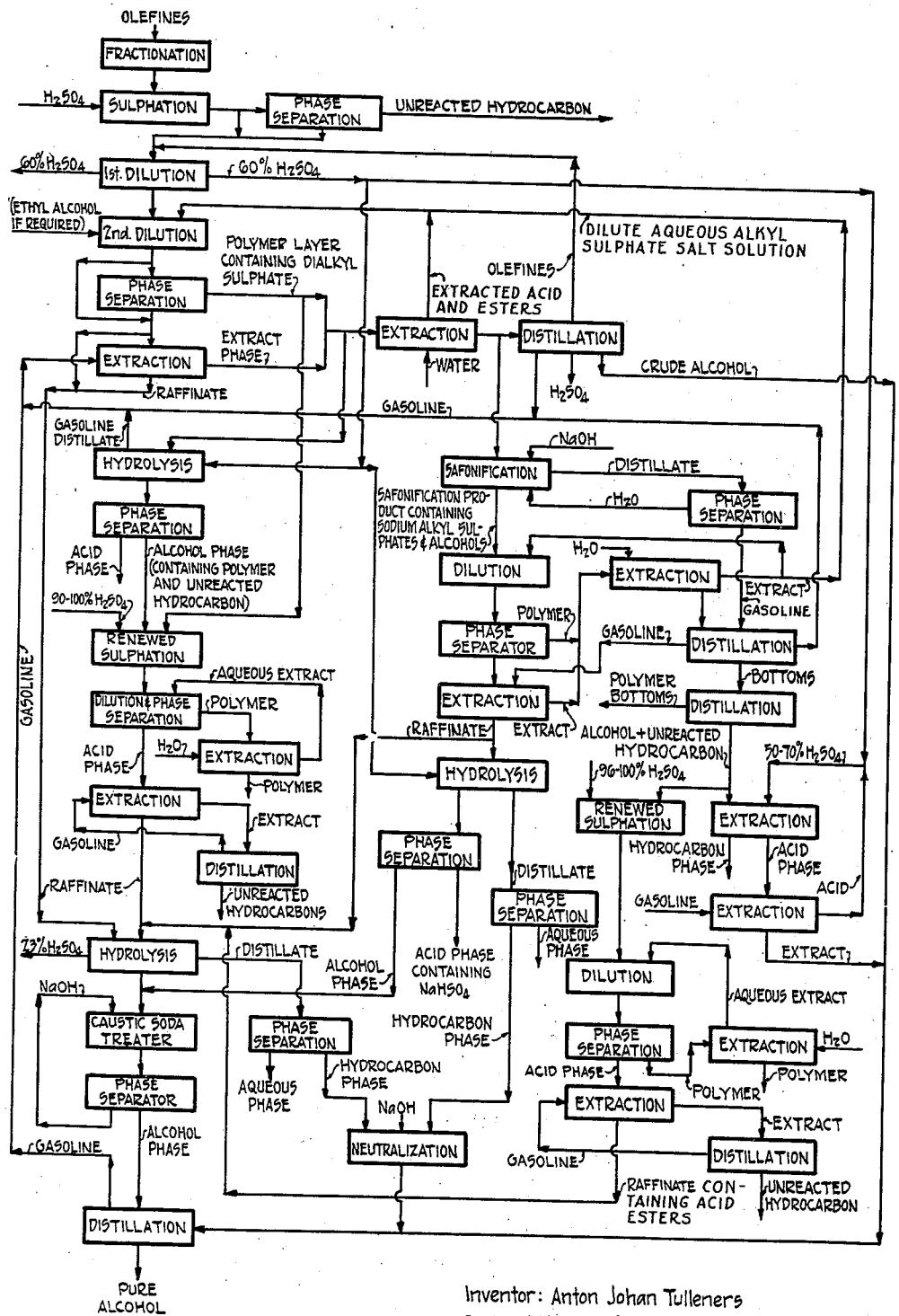

2,326,505

UNITED STATES PATENT OFFICE 2,326,505

MANUFACTURE OF HIGHER ALCOHOLS

Anton Johan Tulleners, Long Beach, Calif., assignor to Shell Development Company, San Francisco, Calif., a corporation of Delaware Application May 29, 1939, Serial No. 276,315
In Great Britain July 19, 1938

4 Claims. (Cl. 260—639)

This invention relates to the production of alcohols of six or more carbon atoms per molecule which are substantially water-insoluble. It deals with a new and more advantageous method of producing such alcohols from the corresponding olefines and is particularly concerned with the manufacture of secondary alcohols from olefinic hydrocarbon mixtures by reaction with a strong acid and hydrolysis of the resulting esters.

An important object of my invention is the provision of a more efficient and economical method for producing higher alcohols in a pure form. Another object is to reduce the cost of such alcohols, and particularly to reduce the consumption of acid in the production of higher secondary alcohols. Other objects include the more efficient utilization of the starting material and more complete recovery of the alcohol produced whereby higher yields of desired products may be obtained at less expense. It is a further object of my invention to provide a simple method for producing secondary alcohols of six or more carbon atoms free from undesired homologues as well as hydrocarbon and other impurities, from olefinic mixtures.

The process of my invention may be applied in the manufacture of secondary and/or tertiary alcohols of six or more carbon atoms per molecule or mixtures thereof from the corresponding olefines regardless of their source or olefine content. As suitable starting material for the preparation of such alcohols, hydrocarbons derived from mineral oils, as petroleum, shale oil and the like, or from mineral oil products, or coal, peat and like carboniferous materials, may be used, as well as derivatives of animal or vegetable oils, fats and waxes. The olefines present in such starting material may be of natural occurrence, the result of a dehydrogenation, distillation, vapor or liquid phase cracking or other pyrogenetic treatment or various combinations of such treatments may be used in preparing the initial olefinic material. The olefines may be applied in a pure state, either as individual olefines or pure olefinic mixtures, or in admixture with paraffins and/or cyclic compounds which may be inert or may undergo simultaneous reaction without interfering with my process.

Suitable acids which may be used in converting higher olefines to alcohols in accordance with my invention include inorganic acids, of which sulfuric, pyrosulfuric, sulfamic, chlorsulfonic, phosphoric, pyrophosphoric and the like are typical, and organic acids such as benzene and naphthalene sulfonic acids and homologues and analogues thereof. The concentrations, temperatures, proportions of reactants and time of reaction to be used will vary with the particular combination of olefine and acid chosen for use.

My invention is broadly applicable to the manufacture of alcohols of six or more carbon atoms per molecule from the corresponding olefine whether the olefine be of straight chain type such as the normal hexylenes, heptylenes, octylenes, dodecylenes, cetene and the like, or branched chain secondary olefines such as 2-methyl-pentene-4, 2-methyl-hexene-5, the 2,2 dimethyl-pentenes and the like or tertiary olefines such as 2-methyl pentene-1 or 2,3 methyl-hexene-2 or 3,2-ethyl pentene-1, 2,2,4-trimethyl pentenes and the like or cyclic olefines as cyclohexene, 1-methyl-cyclopentene-1, methylene cyclohexane and the like. For the purpose of making my invention more clear it will be described in detail with particular reference to its application to the preparation of higher secondary alcohols from normally liquid olefines obtainable by suitable cracking of higher paraffinic hydrocarbons. These olefines offer particular advantages in the manufacture of higher alcohols but it will be understood that my invention is not limited thereto as not only may the same alcohols be obtained from the same olefines from other sources but also the same principles may be applied to the preparation of other alcohols from other olefines of six or more carbon atoms by proper change of operating conditions where required. In particular, where the same or other starting material is used, it may be desirable to first apply a suitable preliminary treatment for selective removal of certain components. Thus, if diolefines are present they may be advantageously removed by means of cuprous chloride, either as an aqueous slurry or an anhydrous suspension or in a supported form or as an aqueous ethanolamine or like solution. Alternatively dilute sulfuric acid and/or phosphoric acid may be used for the removal of diolefines. By proper adjustment of the acid concentration tertiary olefines may be separated from the secondary olefines present and converted to alcohols in accordance with my process or used for the manufacture of ethers as described in U. S. Patent 1,968,601 or converted to polymers or other valuable derivatives or regenerated as described in U. S. Patent 2,012,785 or otherwise used. Suitable treatment, as with caustic or lead plumbite or the like for the removal of sulfur compounds or other impurities may also be carried out prior to treatment of the olefines in accordance with my invention.

For the preparation of secondary alcohols of six or more carbon atoms per molecule, I preferably use as starting material higher paraffinic hydrocarbons. Particularly desirable are hydrocarbon mixtures rich in paraffin waxes, preferably paraffinic hydrocarbon mixtures containing less than about 25% of oily constituents and most preferably paraffin waxes having melting points above about 80° F. Paraffin cakes, slop wax, petrolatum and the like are suitable. While any suitable method of converting such starting material to olefines of six or more carbon atoms may be used, I prefer to employ vapor phase cracking at temperatures of the order of 500° to 550° C. I also prefer to carry out the cracking rapidly and preferably operate with cracking times not exceeding about 5 seconds and most preferably so operate as to avoid polymerization and other undesirable side reactions. Under such preferred cracking conditions, distillates may be obtained having an olefinic content preponderantly composed of straight chain olefines and substantially devoid of branched chain or cyclic unsaturates. Furthermore, these olefines are predominantly alpha olefines, the remainder being straight chain beta olefines. The alcohols obtainable from these cracking distillates by sulfation and hydrolysis substantially consist of straight chain secondary alcohols having the hydroxy group attached to the second carbon atom with a smaller amount of the corresponding alcohol having the hydroxy group attached to the third carbon atom. These alcohols provide an advantageous source of pure individual ketones since they may be dehydrogenated in accordance with U. S. Patent 1,952,702 to produce mixtures of methyl and ethyl ketones which may be separated by means of the crystalline sodium bisulfite addition products of the methyl ketones.

In the preparation of secondary alcohols of six or more carbon atoms per molecule in accordance with my invention, I find that unexpected advantages may be obtained by operating with narrow fractions consisting of individual olefines or of mixtures of olefines preferably differing in carbon content by not more than one carbon atom per molecule. Such fractionation has not previously been considered necessary because the boiling points of the homologous secondary alcohols permit their ready separation from each other by distillation. I have found, however, that pure higher alcohols may be obtained in a more simple and economical manner than if the prior art methods using the entire cracked distillate are employed. By this feature of my invention not only is the use of complicated installations, particularly those required for recovery of product from polymer and other undesired by-products avoided but also greater flexibility of operation is achieved. Thus, for example, the formation of neutral esters is no longer so disadvantageous since where narrow fractions are being treated the entire sulfation product may be hydrolyzed under favorable conditions without danger of undesirable side reactions.

In order to make this feature of my invention clear it will be described in more detail in connection with the preparation of secondary alcohols containing six to nine carbon atoms in the molecule, in which application it is especially advantageous. As thus applied, the cracked distillate is preferably closely fractionated so as to obtain mixtures of olefines having boiling ranges such that the boiling points of the alcohols and any polymers formed therefrom differ sufficiently from each other and from the boiling points of the initial olefines to enable a satisfactory separation of the resulting secondary alcohols to be made by fractional distillation. Preferably also fractions are chosen which have such boiling ranges that the resulting higher alcohols can subsequently be separated in a pure state by means of fractional distillation.

In the preparation of higher alcohols containing up to 9 carbon atoms in the molecule this result may be attained by starting from a $C_6$–$C_7$ or from a $C_8$–$C_9$ cracked distillate fraction, obtainable by suitable fractionation of a liquid cracked distillate containing olefines with up to 9 carbon atoms in the molecule. In case the fractionation has not been sufficiently sharp, so that a small quantity of $C_8$-olefine is left in the $C_6$–$C_7$ fraction, the amount of $C_5$-olefine which is always present in this fraction should be removed, since otherwise the $C_5$-alcohol formed by sulfation and hydrolysis of the cracked fraction cannot be recovered in a pure state owing to its boiling point lying too close to that of the $C_8$-olefine, while moreover the $C_8$-alcohol would remain contaminated with dimer of the $C_5$-olefine. After removal of $C_5$-olefine the presence of $C_8$-olefine in the cracked $C_6$–$C_7$ fraction is less objectionable. Since the removal of $C_5$-olefine, however, makes a separate distillation necessary, it is more economical to start from a $C_6$–$C_7$ fraction which does not contain $C_8$-olefine.

The $C_8$–$C_9$ olefine fraction should not contain any $C_{10}$-olefines, since otherwise, the $C_{10}$-olefines present in the hydrolyzed sulfation product could not be separated from the $C_8$-alcohol. Preferably no $C_7$-olefine should be present in this fraction either, the separation of $C_7$-alcohol from $C_9$-olefine, though feasible, being rather difficult. The $C_8$- and $C_9$-alcohols formed by hydrolysis of the sulfated $C_8$–$C_9$ olefine fraction can readily be separated in a pure state by fractional distillation from the non-converted $C_8$ and $C_9$-olefines and the polymers of these olefines.

Whether or not this advantageous feature of my invention, namely treatment of fractions containing olefines differing in chain length by not more than one carbon atom per molecule, is used, the conditions of reaction of the olefines with acid should be chosen with due regard for the nature of the acid and olefine or olefines involved. For example, in the sulfation of cracked distillate containing preponderantly straight chain alpha and beta olefines of six or more carbon atoms, concentrated acid, preferably of about 85 to 100% concentration, and most preferably 90 to 96% sulfuric acid, may be used at temperatures ranging from about −10° to about 40° C., preferably about 0° to 30° C. The higher the acid concentration used the lower the temperatures preferably employed. Too high temperatures and acid concentrations may cause undesirable polymerization or decomposition of sulfation products or both. For a given acid concentration the temperature in general is preferably lowered as the molecular weight of the olefine used increases. Thus when 90% sulfuric acid was used for the sulfation of a $C_6$–$C_9$ cracked wax fraction, the best results were obtained at 15 to 20° C. In sulfating the corresponding $C_{10}$–$C_{12}$ fraction a temperature of about 15° C. is preferable while for $C_{15}$–$C_{18}$ or $C_{10}$–$C_{18}$ fractions and the like 5 to 10° C. are preferred. By the use of 96% sulfuric acid somewhat higher yields of sulfation products may be obtained, particularly when treating higher-boiling olefines such as $C_{15}$–$C_{20}$ fractions and the like, at lower temperatures, e. g. —10° to 0° C.

Although less important when selected narrow fractions substantially comprising olefines differing in carbon content by not more than one carbon atom per molecule are used in accordance with my invention, it is generally desirable to use reaction conditions which favor formation of mono-alkyl esters of the acid. The best ratio of acid to olefines varies with the character of the acid and olefines involved. I usually prefer to use at least equal molecular amounts of olefine and acid. The formation of dialkyl sulfates tends to increase under otherwise identical conditions with increasing molecular weight of the olefines and is also promoted by increased temperatures and too low acid to olefine ratios. When treating olefines of six to nine carbon atoms per molecule an equal molecular amount of 90% sulfuric acid is suitable, for although higher yields may sometimes be obtained by the use of excess acid this does not usually compensate for the increased consumption of acid. With $C_{10}$–$C_{18}$ olefines the best results are obtained by the use of one and one-half mols of sulfuric acid per mol of olefine calculated from the bromine number of the mixture being treated.

I have found that it is important to control the concentration of acid used for hydrolysis of alkyl-sulfates of the higher olefines. In particular, the extent to which the sulfation mixture is diluted prior to hydrolysis has a material influence on the course of the hydrolysis and on the yield and purity of the alcohols obtainable therefrom. I have further discovered that it is unnecessary and undesirable to employ the large amounts of acid formerly used for hydrolysis of alkyl sulfates. Based upon these discoveries I have developed a more economical and efficient procedure for the manufacture of secondary alcohols of six or more carbon atoms per molecule. In accordance with the process of my invention, olefines corresponding to such alcohols are sulfated and the resulting alkyl sulfates are hydrolyzed under such conditions of acid concentration that the lower layer obtainable by stratification of the hydrolyzed product contains sulfuric acid of 10%–40% concentration. Most preferably, I first selectively remove a part of the free sulfuric acid content of the olefine sulfation product and then dilute the remainder to bring the acid concentration within the above-defined preferred range.

If the sulfation product is diluted so far that after hydrolysis an acid containing less than 10% sulfuric acid results, the hydrolysis is undesirably slow even when high temperatures are used. When the dilution is such that an acid of more than 40% concentration is obtained in the lower layer after hydrolysis, undesirable side reactions, such as dehydration and/or condensation of the alcohols formed takes place at temperatures which give practical hydrolysis rates. Not only is the alcohol yield thus reduced but also the purity of the alcohols formed is materially lowered as the result of contamination by by-products which are extremely difficult or even impossible to remove. Furthermore, due to the high content of alkyl sulfates of the reaction mixture, separation of hydrocarbon impurities is difficult. It is a feature of my invention that the dilution of the olefine absorption product may be more advantageously effected by means of aqueous solutions containing valuable alkyl sulfates recovered from later stages of the process whereby loss of such materials is avoided without resort to separate recovery treatment.

In order to reduce the amount of free acid present during the hydrolysis, it is advantageous to carry out selective extraction of the acid. Thus, for example by adding a small quantity of water and separating the resulting aqueous layer, the greater part of the free sulfuric acid may be removed in a concentration exceeding 50% and usually a concentration of 60% or more. To prevent decomposition during the preliminary acid removal, it is preferable to keep the temperature low, for example, at about 15° C. Excessively low temperatures are preferably avoided, however, since they unduly prolong the time required for stratification and separation of the acid. By carrying out this acid removal in several successive stages, 90% or more of the free sulfuric acid can be removed as acid sufficiently concentrated for reuse in the process or more economical recovery as by reconcentration or the like. Instead of water alone other solvents including aqueous salt solutions or solvents for the alkyl acid sulfates or other ester or esters involved may be used. It may be advantageous to use both types of solvent. For example, the free acid may be selectively separated by means of an aqueous solvent in the presence of a water insoluble alcohol, ketone, ether or the like. Alternatively selective neutralization may be used for removal of unreacted acid. Since the cost of the acid is usually the largest item of expense in the production of alcohols from olefines, my process of separating usable acid prior to hydrolysis offers an important means for economy.

The attached drawing is a flow sheet or diagrammatic representation of the steps of my process showing different methods of treatment which may be used in producing alcohols from olefines of six or more carbon atoms. Still other modifications in addition to the alternative procedures shown may be used.

Although it is not essential to my invention it is advantageous to remove hydrocarbons, if present, from the acid-olefine reaction product prior to carrying out the hydrolysis step. I prefer to carry out such hydrocarbon removal after first separating unreacted acid as above described and then diluting the remaining mixture so as to bring the acid concentration to a value such that acid of 10 to 40% strength will be present in the acid layer after hydrolysis. The hydrocarbon separation may be effected by simple stratification or by solvent extraction or more preferably both. Where stratification after dilution is used an upper, or so-called polymer layer, containing the greater part of any di-alkyl sulfates present, polymers and non-converted hydrocarbons and a small amount of monoalkyl sulfates and free acid is formed and may be removed.

When starting from cracked products containing olefines with less than 10 carbon atoms in the molecule, for example a $C_6$–$C_9$ cracking fraction, or narrower fractions thereof, the stratification of the diluted sulfated product takes place spontaneously and is in general completed after about 1° hour. In the case of mixtures derived from olefines with more than 10 carbon atoms the desired separation into two layers may not occur until after the addition of a demulsifying agent, e. g. ethanol, acetone or the like, the sulfation product otherwise remaining in the form of a non-readily separatable emulsion, owing to the strongly emulsifying properties of the higher acid alkyl sulfates. The temperature during the separation into two layers should be low, preferably below 25° C. since otherwise hydrolysis may already occur to a certain extent, which is not desirable in this stage.

Besides mono-alkyl sulfates the lower layer remaining after removal of the polymer layer usually still contains a certain amount of polymers, non-converted cracked distillate and dialkyl sulfates, the separation never being quantitative. The alcohols obtained therefrom by hydrolysis, though more pure than those obtainable from the entire mixture, may therefore contain a certain amount of polymers or other hydrocarbon impurities. Part of these impurities can be removed by distillation, but those having boiling points corresponding to those of the alcohols cannot be separated from the alcohols by distillation and alcohols obtained in this manner in general have a purity not exceeding about 90%.

I have found that substantially pure alcohols can be produced by subjecting the sulfated mixture, after the second dilution according to the invention and prior to the hydrolysis, to an extraction treatment with a hydrocarbon or hydrocarbon mixture, e. g. pentane, benzene, gasoline and the like, which has a boiling point or boiling range sufficiently different from that of the alcohol or alcohols to be produced, to permit separation of the extractant by distillation. I prefer to use hydrocarbon solvents boiling below the boiling point of the lowest boiling alcohol being manufactured. It is of advantage first to separate the diluted sulfated mixture into two layers and apply the extraction treatment to the resulting lower layer, after removal of the upper polymer layer, the quantity of material to be extracted being thus reduced.

The extraction is preferably carried out in a tower, constructed of or coated with material resistant to dilute sulfuric acid and monoalkyl sulfate and filled with Raschig rings or the like. When treating mixtures resulting from the sulfation of olefines with more than 10 carbon atoms, a demulsifying agent, e. g. ethanol, is preferably added in order to prevent the formation of emulsions during the extraction.

The extract phase obtained contains the greater part of the extracting agent, substantially all the di-alkyl sulfates, polymers and non-converted initial material, and further a slight amount of entrained free sulfuric acid and monoalkyl sulfate, which acid compounds can easily be removed by washing the extract with water, preferably the water which is to be used for the dilution of the sulfated mixture. In case a preliminary separation of the polymer layer has been effected, this layer may be combined with the extract, whereupon the resulting mixture may be washed for the removal of free sulfuric acid and monoalkyl sulfate and worked up further as will be described below.

The raffinate phase contains the mono-alkyl sulfates, free sulfuric acid, water, ethanol or another demulsifying agent if such agent has been employed during the extraction, part of the extracting agent and traces of polymers and non-converted initial material.

The hydrolysis of the alkyl sulfates, whether or not purified in any or all of the foregoing ways, is preferably carried out under conditions promoting intimate contact of the two liquid phases present during hydrolysis. This is desirable because otherwise the higher alcohols formed during hydrolysis form a separate layer from the acid present. This alcohol layer not only dissolves any dialkyl sulfates present but also may take up a part of the mono-alkyl sulfates. The esters thus removed from contact with the acid hydrolyze more slowly and so prolong the time of treatment necessary and increase the size of equipment required. I therefore prefer to carry out the hydrolysis in apparatus provided with an effective mixing device. Suitable stirring devices or a pump adapted for recycling the mixture under treatment or other means of maintaining the alcohol phase in intimate contact with the acid may be used. Under such conditions substantially complete hydrolysis may be attained in 4 to 5 hours even where large amounts of di-alkyl sulfates are present.

The hydrolysis may be carried out under normal or superatmospheric or reduced pressure and advantageously excess olefine may be present to retard decomposition reactions tending to give such olefine. A wide range of hydrolysis temperatures may be used including, for example, temperatures of 40 to about 150° C., however, temperatures of about 85 to 110° C. are generally most convenient. The hydrolysis may be conducted under conditions at which one or more components of the mixture distill. Thus, at 100° C. for example, the extracting agent may be distilled off completely. Any de-emulsifying agent such as ethanol or methyl ethyl ketone present may also be removed. All or a part of the higher alcohols being produced may be distilled either simultaneously with or subsequently to the removal of lower boiling components.

Especially in the case of mixtures yielding alcohols of six to twelve carbon atoms, it may be advantageous to carry out the hydrolysis in such a manner that all the alcohol or alcohols of such type are distilled off during the process. In such a case it is desirable to cool the distillate partially, for example, to 90 to 95° C. and to return the lower aqueous layer formed on stratification of the distillate to the hydrolyzing apparatus, whereby substantial heat economy is effected and the acid resulting from the hydrolysis is prevented from becoming too concentrated.

In general it is, however, more economical and thus preferable to carry out the hydrolysis while distilling only part of the alcohols formed. The distillate, consisting of higher alcohols, extracting agent, water and possibly also ethanol or another demulsifying agent used in the extraction treatment, is then cooled, as a result of which it separates into two layers, an upper layer containing the higher alcohols and the extracting agent and a lower layer containing water and demulsifying agent (if present), which latter may then be recovered.

The upper layer may then, after a simple neutralization with soda or diluted caustic alkali be fractionally distilled for separating and recovering the extracting agent and, if desired, separation of the higher alcohols into fractions.

After completion of the hydrolysis the higher alcohols which have not distilled over may be separated as a top layer from the acid resulting from the hydrolysis; this acid practically does not contain any organic matter or inorganic salts and can readily be reconcentrated.

Owing to the presence of small amounts of sulfonic acids and other organic sulfur compounds these non-distilled alcohols are preferably not distilled as such, or even after a simple neutralization treatment because these sulfur compounds decompose with liberation of sulfuric acid, which latter decomposes part of the alcohols into olefines and water or condenses them to higher molecular compounds at the elevated temperatures prevailing during fractional distillation of the alcohols. If no extraction of the diluted mono-alkyl sulfate layer has been applied, the undesirable side reactions due to these troublesome sulfur compounds will be even more pronounced.

These sulfur compounds present in the crude undistilled alcohols can be removed or rendered innocuous by treatment in accordance with U. S. Patent 2,139,179. For example, the crude alcohols may be treated at elevated temperatures, e. g. at about 100° C., with a solution of caustic alkali having a concentration of 20% or more. After this treatment, whereby the sulfonic acids and other sulfur compounds are saponified and converted into neutral compounds which for the greater part remain dissolved in the higher alcohols, the alcohols can be distilled without any risk of losses owing to condensation or other undesirable side reactions. After the caustic alkali lye has settled and been brought again to the required concentration, it may be reused for the treatment of further crude alcohols.

The higher alcohols obtained in this manner have a purity of 97 to 100%.

The extracting agent present in the extract phase can be recovered, together with any alcohol or other demulsifying agent that may be present, by distillation. During this distillation the di-alkyl sulfates are decomposed into sulfuric acid, alcohols, olefines and polymerization products thereof, and from the product thus remaining after the recovery of the extracting agent the alcohols cannot readily be recovered. The olefines formed may be returned to the sulfuric acid treatment stage of the process.

Now it has further been found that the di-alkyl sulfates present in the extract phase and/or the separated polymer layer can economically be subjected to a saponification treatment. This saponification, which is carried out by heating the extract phase or the polymer layer, or the extract phase together with the polymer layer, e. g. to a temperature of 100° C., with an aqueous or alcoholic solution or suspension of an inorganic or organic basic compound, such as sodium, potassium, ammonium or calcium hydroxide, triethanolamine, ethylenediamine, triglycerylamine, sodium or potassium carbonate or the like, results in each molecule of di-alkyl sulfate being converted into one molecule of the corresponding salt of the mono-alkyl sulfate and one molecule of higher alcohol.

If the saponification is effected by means of an aqueous solution or suspension, it is advantageous to start the treatment in the presence of a sufficient amount of the ester salt to be formed, to produce a good emulsion in the mixture. The saponification proceeds readily under such conditions while sufficient ester salt is formed to maintain this emulsion during the remaining part of the reaction.

During the saponification all the extracting agent (and alcohol or other demulsifying agent, if present) may be distilled over, together with a certain amount of water, which is preferably recycled to the saponification vessel. A small amount of the non-converted cracked distillate and polymers may also be distilled over.

The saponified reaction mixture containing alkyl ester salts, non-converted cracked distillate, polymers and higher alcohols, water and a small excess of the base used in the saponification, is then freed from the oily constituents. To this end the mixture is first diluted with water until the alkyl ester salt concentration is about 15%, if necessary while adding ethyl alcohol or another demulsifying agent. The diluted mixture may be stratified and the polymer layer containing the greater part of the non-converted cracked distillate, the polymers and the higher alcohols preferably separated. The diluted mixture or the lower layer thereof remaining after removal of the polymer layer is subjected to a countercurrent extraction treatment with a suitable extracting agent for the hydrocarbons and alcohols still present. Suitable extracting agents are, for example, gasoline, pentane, benzene and the like. When cracked distillate boiling from 60 to 160° C. is taken as starting material, gasoline boiling from 80 to 100° C. is very suitable as extracting agent, while with cracked distillate boiling above 160° C. one may advantageously use gasoline boiling from 80 to 130° C. as extracting agent.

The raffinate phase obtained by the extraction of the alkyl ester salt solution consists of an aqueous solution of alkyl ester salts containing slight amounts of extracting agent and is practically devoid of inorganic salts. It is, therefore, very suitable for the preparation of alkyl ester salts with a very low content of inorganic salts, to which end the solution is evaporated for the recovery of the extracting agent present therein, whereupon the resulting concentrated aqueous alkyl ester salt solution is either used as such or converted to powder by drying and pulverization.

Instead of being worked up to alkyl ester salts the raffinate phase may also be used for the production of higher alcohols by acid hydrolysis. The acid to be added for effecting this hydrolysis may be part of the acid initially separated off from the sulfation mixture. The amount of acid should be so adjusted that the concentration of the acid after the hydrolysis lies in the same ranges as that of the acid after the hydrolysis of the mono-alkyl sulfate-containing layer. The hydrolysis and the treatment with caustic alkali lye of any non-distilled alcohols is advantageously carried out in the same manner as that of the mono-alkyl sulfate-containing layer.

Alternatively the refined alkyl sulfate salt solution may also be combined with the refined acid alkyl sulfate solution, whereupon the resulting mixture may be subjected to hydrolysis without any special addition of acid and further worked up to alcohols in the same manner as described with respect to the separate treatment of the refined acid alkyl sulfate solution. When the mixture has been thus treated, the acid resulting from the hydrolysis contains sodium bisulfate or other sulfuric acid salts which may interfere with reuse and/or reconcentration of the acid. If it is desired to reconcentrate the acid under such circumstances, the hydrolysis of the acid alkyl sulfate solution (which yields acid free from sodium bisulfate or other salt and can readily be reconcentrated) should be kept separate from the hydrolysis of the alkyl sulfate salt solution.

If carried out separately, the higher alcohol distillates and the crude alcohols, after treatment with lye, obtained in the two hydrolyzing steps may be combined and the pure alcohols recovered therefrom by fractionation.

The extract phase obtained in the extraction of the alkyl sulfate solution, together with polymer layer which may be separated prior to the extraction, is preferably washed with water in order to remove any alkyl sulfate salt which may be present. The resulting extract is preferably used for dilution of the alkyl sulfate salt solution. The washed mixture is combined with the distillate obtained during the saponification of the extract from the acid alkyl sulfate solution and subjected to fractional distillation, whereby a distillate is obtained consisting of the extracting agent used, together with any components of the non-converted cracked material that have the same boiling point or range.

The distillation residue, consisting of non-converted cracked material, polymers and higher alcohols, may be separated by fractionation into bottoms consisting of the polymers and a distillate containing the non-converted cracked material (comprising olefines and paraffins) and the higher alcohols resulting from the saponification of the di-alkyl sulfates. This distillate, the so-called "polymer distillate," is quite suitable for being subjected to a renewed sulfation, preferably by means of acid of higher concentration, e. g. 96% $H_2SO_4$, than in the first sulfation treatment. The resulting sulfation product can then be worked up to higher alcohols or to alkyl sulfate salts. The higher alcohols may first be separated from the hydrocarbons by extraction with diluted sulfuric acid, preferably acid of 60 to 70% concentration. The higher alcohols may be subsequently recovered from the alcohol-containing acid extract obtained, by extraction with a suitable hydrocarbon solvent, e. g. benzene, and the solvent removed from the alcohol extract by fractionation.

The extract phase, obtained by extraction of the sulfation product after the so-called second dilution according to the invention, preferably after removal of the polymer layer, may also be worked up in the following manner.

Sulfuric acid is added to the extract phase containing polymers, non-converted cracked distillate, and di-alkyl sulfates dissolved in extracting agent, and the mixture is subjected to hydrolysis while distilling off the extracting agent. After the hydrolysis the acid is separated off as lower layer, the upper layer, containing higher alcohols, polymers and non-converted cracked distillate, is subjected to a renewed sulfation treatment with highly concentrated sulfuric acid, e. g. acid of 96 to 100%. Since the concentration of olefines is much lower than in the original cracked distillate and the sulfation of higher alcohols yields very little di-alkyl sulfates, this renewed sulfation will result almost exclusively in acid sulfates. Instead of sulfating the upper layer from the hydrolysis alone, previously separated polymer layer may be admixed therewith before such sulfation treatment. It is advantageous to use acid recovered in the first dilution for effecting the initial hydrolysis according to this modification of the invention.

The product of the renewed sulfation may be worked up further in a manner analogous to that applied in the sulfation of the original cracked distillate, with the exception that, the polymer layer separated after dilution of the product of the renewed sulfation and the extract need not be worked up further as they contain practically no di-alkyl sulfates.

The following example illustrates one method of applying my invention to the manufacture of $C_6$–$C_9$ alcohols as a continuous process. The invention may also be applied to batch or intermittent operations.

Into an iron reaction vessel there is continuously introduced a $C_6$–$C_9$ cracked wax distillate fraction, having a bromine value of 102.7 (obtained by fractionation of a vapor phase cracking product of a paraffinous hydrocarbon material and having an olefinic content composed almost exclusively of straight chain alpha and beta mono-olefins), and sulfuric acid of 90% concentration. Using a hydrocarbon feed rate of 30 kgs. per hour the acid is preferably fed at a rate of about 30.2 kgs. per hour. The temperature is preferably maintained at about 15° C. by cooling, e. g. by evaporation of liquefied gaseous hydrocarbon in accordance with U. S. Patent 1,055,873. A reaction time of about 1.5 to 2 hours is suitable. The sulfation product is continuously removed at a rate of about 60.2 kgs. per hour and introduced into a lead-lined vessel in which it is diluated with water added at a rate of 9 kgs. per hour, the temperature being kept at about 15° C. The diluted mixture is separated into two layers and the bottom layer, consisting of 60% sulfuric acid, withdrawn at a rate of 17.2 kgs. per hour. The top layer containing the mono and di-alkyl sulfates, non-converted cracked distillate, polymers and some free sulfuric acid is led at a rate of about 52 kgs. per hour to a lead-lined vessel in which a second dilution is carried out by mixing with water introduced at a rate of 60 kgs. per hour whereby an acid concentration of about 23% is obtained after hydrolysis.

The diluted sulfation product is fed at a rate of about 112 kgs. per hour to a lead-lined separator in which an upper polymer layer is allowed to separate. This layer is withdrawn while the lower impure alkyl sulfate layer is extracted in countercurrent at 20° C. with 50% by volume of gasoline (boiling range 80 to 100° C.). The extract phase, consisting of a solution of dialkyl sulfates, non-converted cracked distillate and polymers in gasoline, is removed at a rate of about 54.7 kgs. per hour and conducted, together with the polymer layer leaving the separator to a saponification vessel.

The raffinate containing about 23.6% by wt. of mono-alkyl sulfates, some gasoline and free sulfuric acid, is hydrolyzed by heating at a temperature of about 100° C. while thoroughly stirring. During the hydrolysis the gasoline, together with water and part of the higher alcohols formed distils over. The lower water layer of the condensate is removed and the upper layer of gasoline and higher alcohols is fed to a neutralization vessel at a rate of about 13 kgs. per hour. The undistilled reaction mixture is separated into an alcohol layer, which is removed at a rate of about 7.5 kgs. per hour and a lower layer consisting of sulfuric acid of about 23% concentration discharged.

The combined polymer layer and extract are saponified while vigorously stirring with a 20% solution of caustic soda introduced at a rate of 3.15 kgs. per hour. The reaction time at about 100° C. is about 4 hours. During the saponification the gasoline, together with part of the non-converted cracked product and polymers, part of the higher alcohols formed and some water, is vaporized. The vapor mixture is condensed and separated into a lower water layer, which is recycled to the saponification and an upper layer consisting of a gasoline solution of higher alcohols, non-converted cracked product and polymers, which is drawn off. The saponification product, which contains about 25.7% of sodium alkyl sulfate and 54.9% of non-converted cracked distillate and polymers, is withdrawn at a rate of about 13.1 kgs. per hour and diluted with water fed at a rate of 18 kgs. per hour. The diluted sodium alkyl sulfate solution after polymer separation is subjected to a countercurrent extraction with gasoline fed at a rate of about 10.8 kgs. per hour. The extract phase is combined with the previously separated polymer layer and the upper layer of the distillate from the saponification. The resulting mixture is separated by distillation into gasoline as top product and a bottom produce removed at a rate of about 13.3 kgs. per hour and consisting of a mixture of about 14% by weight of higher alcohols and about 86% by weight of non-converted cracked product boiling about 100° C. and polymers. This mixture is treated with 96% $H_2SO_4$ to effect renewed sulfation and the product diluted and extracted in the same way as the original sulfation product. The alkyl sulfates thus obtained may be hydrolyzed along with the original mono-alkyl sulfates.

The refined aqueous solution containing about 13.5% by weight of sodium alkyl sulfate and also some gasoline is fed at a rate of about 25 kgs. per hour to a hydrolyzer with sulfuric acid of about 60% concentration added at a rate of about 5 kgs. per hour. This acid is preferably a part of that recovered from the original sulfation product. During the hydrolysis, which is carried out at about 100° C. the gasoline present is vaporized together with part of the higher alcohols formed and some water. This vaporized mixture is condensed and stratified. The upper layer of gasoline and higher alcohols is caustic soda treated, together with the mixture of gasoline and higher alcohols from hydrolyzer distillate.

The undistilled hydrolyzed mixture is separated into an upper layer of higher alcohols, which is withdrawn at a rate of about 1.25 kgs. per hour and neutralized and a lower layer consisting of acid containing sodium bisulfate. The combined crude higher alcohols are heated to about 100° C. with caustic soda of about 20% concentration while stirring, the reaction time being about one hour. The product is continuously drawn off into a stratifier from which alcohol layer is withdrawn at a rate of about 8.8 kgs. per hour and fed, together with the previously described neutralized gasoline-alcohol mixture, to a fractionation column. In this column the gasoline is recovered as top product while the higher alcohols are withdrawn as bottom product at a rate of about 16.5 kgs. per hour. These alcohols are a mixture of $C_6$-$C_9$ alcohols having a purity of about 97% and represent substantially complete conversion of the initially formed alkyl sulfates.

While I have emphasized the manufacture of higher alcohols because of the many advantages which my invention offers over prior methods of producing alcohols it will be understood that my process may be applied to the production of other olefine hydration products by suitable modification of operating conditions. For example, ethers may be produced carrying out the hydrolysis under more strongly acid conditions. Other features of my invention such, for example, as the described renewed sulfation procedures carried out with stronger acid after hydrolysis of polyalkyl esters, are advantageous regardless of the olefine derivative being produced and may also be used in the manufacture of esters, ester salts and the like. Still other variations may be made in the described process without departing from my invention which is not limited by any theory proposed in explanation of the more advantageous results attained but only by the appended claims wherein it is intended to claim all novelty inherent therein as broadly as possible in view of the prior art.

I claim as my invention:

1. In a process of producing a secondary alcohol of at least six carbon atoms per molecule from the corresponding olefine by treating said olefine with at least an equal molecular amount of 80 to 100% sulfuric acid under sulfating conditions and hydrolyzing alkyl sulfates thereby formed, the improvement which comprises diluting the mixture of alkyl acid sulfate, dialkyl sulfate and free sulfuric acid resulting from said sulfation with water at about 15° C. to cause separation of a phase substantially free from alkyl acid sulfates and containing sulfuric acid of 50% to about 60% concentration from a phase containing said alkyl acid sulfate and dialkyl sulfate, withdrawing the free sulfuric acid phase and further diluting the phase containing the alkyl acid sulfate at about the same temperature with sufficient water to produce an aqueous layer which contains after hydrolysis of the alkyl acid sulfate and stratification sulfuric acid of 10 to 40% concentration, removing dialkyl sulfate from the diluted mixture, treating the separated dialkyl sulfate with a base to produce the corresponding secondary alcohol and alkyl acid sulfate salt therefrom and reacting said alkyl sulfate salt with the free sulfuric acid separated from the sulfation product to produce additional alcohol.

2. In a process of producing a secondary alcohol of at least ten carbon atoms per molecule from the corresponding olefine by treating said olefine with at least an equal molecular amount of 80 to 100% sulfuric acid under sulfating conditions and hydrolyzing alkyl sulfates thereby formed, the improvement which comprises diluting the mixture of alkyl acid sulfate, dialkyl sulfate and free sulfuric acid resulting from said sulfation with water at about 15° C. to cause separation of a phase substantially free from alkyl acid sulfates and containing sulfuric acid of 50% to about 60% concentration from a phase containing said alkyl acid sulfate and dialkyl sulfate, withdrawing the free sulfuric acid phase and further diluting the phase containing the alkyl sulfates at about the same temperature with sufficient water to produce an aqueous layer which contains after hydrolysis of the alkyl acid sulphate and stratification sulfuric acid of 10 to 40% concentration, extracting dialkyl sulfate from the diluted mixture with a hydrocarbon boiling at a lower temperature than the alcohol corresponding to said dialkyl sulfate, treating the dialkyl sulfate with a base to produce the corresponding secondary alcohol and alkyl sulfate salt therefrom and reacting said alkyl sulfate salt with the free sulfuric acid separated from the sulfation product to produce additional alcohol.

3. In a process of producing a secondary alcohol of ten to twenty carbon atoms per molecule from the corresponding olefine by treating said olefine with at least an equal molecular amount of 80 to 100% sulfuric acid under sulfating conditions and hydrolyzing alkyl sulfates thereby formed, the improvement which comprises diluting the mixture of alkyl acid sulfate, dialkyl sulfate and free sulfuric acid resulting from said sulfation with water at about 15° C. to cause separation of a phase substantially free from alkyl acid sulfates and containing sulfuric acid of 50% to about 60% concentration from a phase containing said alkyl acid sulfate and dialkyl sulfate, withdrawing the free sulfuric acid phase and further diluting the phase containing the alkyl acid sulfate at about the same temperature with sufficient water to produce an aqueous layer which contains after hydrolysis of the alkyl acid sulfate and stratification sulfuric acid of 10 to 40% concentration, adding a deemulsifying agent to the diluted mixture and stratifying to separate a phase containing dialkyl sulfate from a phase containing alkyl acid sulfate, treating the separated dialkyl sulfate with a base to produce the corresponding secondary alcohol and alkyl acid sulfate salt therefrom and reacting said alkyl sulfate salt with the free sulfuric acid separated from the sulfation product to produce additional alcohol.

4. In a process of producing a secondary alcohol of at least six carbon atoms per molecule from the corresponding olefine by treating said olefine with at least an equal molecular amount of 80 to 100% sulfuric acid under sulfating conditions and hydrolyzing alkyl sulfates thereby formed, the improvement which comprises diluting the mixture of alkyl acid sulfate, dialkyl sulfate and free sulfuric acid resulting from said sulfation with water at about 15° C. to cause separation of a phase substantially free from alkyl acid sulfates and containing sulfuric acid of 50% to about 60% concentration from a phase containing said alkyl acid sulfate and dialkyl sulfate, withdrawing the free sulfuric acid phase and further diluting the phase containing the alkyl acid sulfate at about the same temperature with sufficient water to produce an aqueous layer which contains after hydrolysis of the alkyl acid sulfate and stratification sulfuric acid of 10 to 40% concentration, stratifying the diluted mixture to separate therefrom a phase containing dialkyl sulfate, treating the separated dialkyl sulfate with a base to produce the corresponding secondary alcohol and alkyl acid sulfate salt therefrom and reacting said alkyl sulfate salt with the free sulfuric acid separated from the sulfation product to produce additional alcohol.

ANTON JOHAN TULLENERS.